US012475775B2

(12) United States Patent
Nakagawa

(10) Patent No.: US 12,475,775 B2
(45) Date of Patent: Nov. 18, 2025

(54) INFORMATION PROCESSING METHOD

(71) Applicant: TOYOTA JIDOSHA KABUSHIKI KAISHA, Toyota Aichi-ken (JP)

(72) Inventor: Yuki Nakagawa, Toyota Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

(21) Appl. No.: 18/400,669

(22) Filed: Dec. 29, 2023

(65) Prior Publication Data

US 2024/0221485 A1 Jul. 4, 2024

(30) Foreign Application Priority Data

Jan. 4, 2023 (JP) ................................ 2023-000279

(51) Int. Cl.
*G08B 21/24* (2006.01)

(52) U.S. Cl.
CPC .................................... *G08B 21/24* (2013.01)

(58) Field of Classification Search
CPC .......... G08B 21/24; G08G 1/148; H04W 4/48
See application file for complete search history.

(56) References Cited

U.S. PATENT DOCUMENTS

| | | | | |
|---|---|---|---|---|
| 9,522,651 | B2 * | 12/2016 | Tominaga | B60R 25/2009 |
| 2007/0243854 | A1 | 10/2007 | Taki et al. | |
| 2014/0176326 | A1 | 6/2014 | Tominaga | |
| 2021/0287456 | A1 * | 9/2021 | Yezersky | H04W 4/44 |

FOREIGN PATENT DOCUMENTS

| | | |
|---|---|---|
| JP | 2005-346265 A | 12/2005 |
| JP | 2006-195580 A | 7/2006 |
| JP | 2006-235823 A | 9/2006 |
| JP | 2008-095441 A | 4/2008 |
| JP | 2014-121936 A | 7/2014 |

* cited by examiner

*Primary Examiner* — Brian Wilson
(74) *Attorney, Agent, or Firm* — Dinsmore & Shohl LLP

(57) ABSTRACT

An information processing method by an information processing apparatus includes acquiring, upon detecting that a predetermined operation for a vehicle has been forgotten, positional information for the vehicle and positional information for a user terminal, acquiring, upon determining that a position of the user terminal is not in a vicinity of a position of the vehicle, vehicle information for the vehicle, and not notifying, when the vehicle is determined from the vehicle information to be in an abnormal state, the user terminal that the predetermined operation has been forgotten, or notifying, when the vehicle is determined from the vehicle information to be not in an abnormal state, the user terminal that the predetermined operation has been forgotten.

4 Claims, 5 Drawing Sheets

INFORMATION PROCESSING METHOD

CROSS-REFERENCE TO RELATED APPLICATION

This application claims priority to Japanese Patent Application No. 2023-000279, filed on Jan. 4, 2023, the entire contents of which are incorporated herein by reference.

TECHNICAL FIELD

The present disclosure relates to an information processing method.

BACKGROUND

A notification apparatus that notifies a vehicle user that they have forgotten an operation is known. For example, see Patent Literature (PTL) 1. Specifically, the notification apparatus detects changes in the relative positions of the vehicle and the vehicle user from a time in-vehicle equipment enters a state, which the in-vehicle equipment should not be in while the vehicle is parked, until that state has continued for a predetermined time. When that state has continued for a predetermined time, the notification apparatus notifies a mobile terminal in possession of the vehicle user that the in-vehicle equipment is in an abandoned state only when both the vehicle and the user terminal move away from each other.

CITATION LIST

Patent Literature

PTL 1: JP 2006-235823 A

SUMMARY

The above background technology determines only times and distances in order to perform notifications. However, depending on the vehicle state, no notification may be necessary.

It would be helpful to reduce hassle of being subject to unnecessary notifications.

An information processing method according to an embodiment of the present disclosure is an information processing method by an information processing apparatus, the information processing method including:

- acquiring, upon detecting that a predetermined operation for a vehicle has been forgotten, positional information for the vehicle and positional information for a user terminal;
- acquiring, upon determining that a position of the user terminal is not in a vicinity of a position of the vehicle, vehicle information for the vehicle; and
- not notifying, when the vehicle is determined from the vehicle information to be in an abnormal state, the user terminal that the predetermined operation has been forgotten, or notifying, when the vehicle is determined from the vehicle information to be not in an abnormal state, the user terminal that the predetermined operation has been forgotten.

According to an embodiment of the present disclosure, it is possible to reduce hassle of being subject to unnecessary notifications.

DETAILED DESCRIPTION

Figure 1:
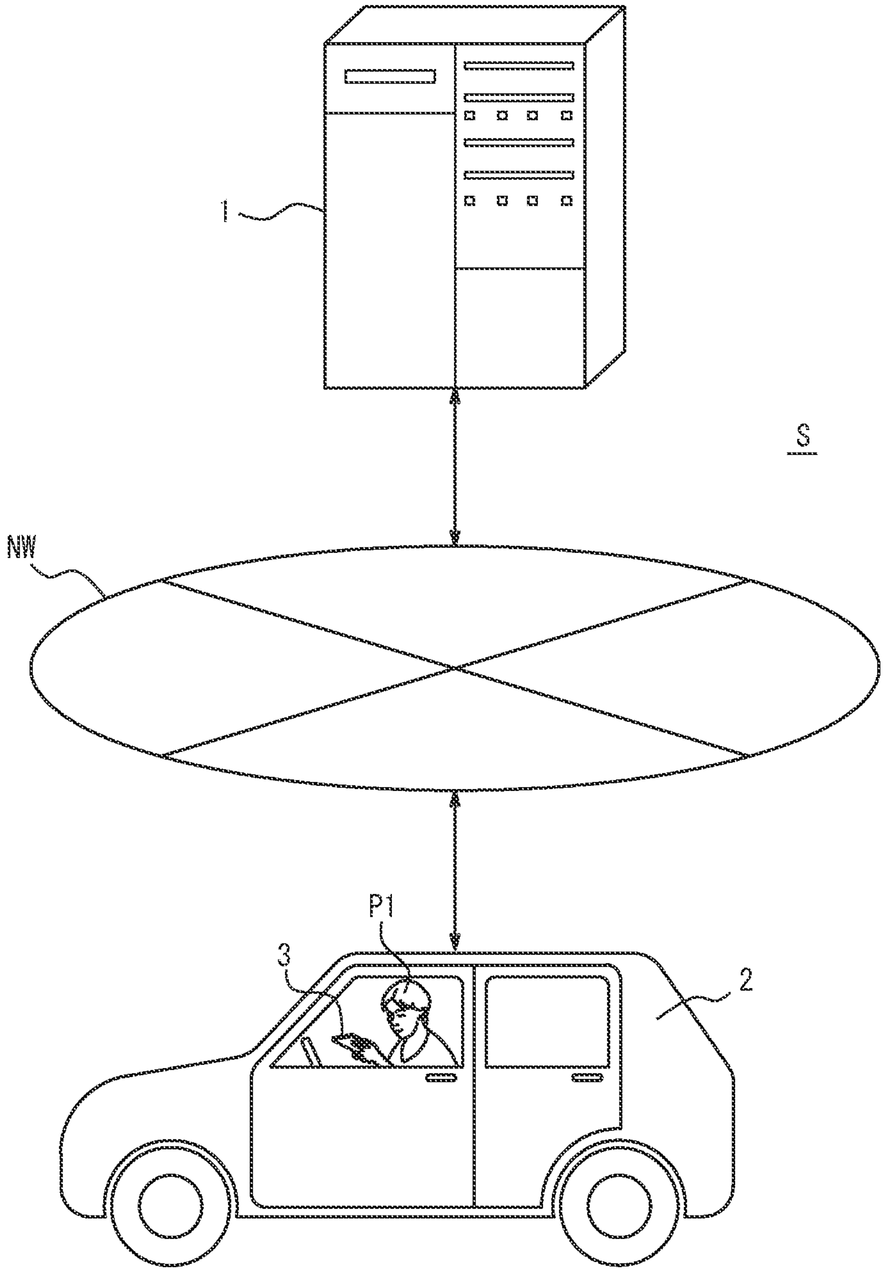
FIG. 1 is a schematic diagram of an information processing system.

FIG. 1 is a schematic diagram of an information processing system S according to the present embodiment. The information processing system S includes an information processing apparatus 1, a vehicle 2, and a user terminal 3, which are communicably connected to each other via a network NW. The network NW includes, for example, a mobile communication network, a fixed communication network, or the Internet. The user terminal 3 is operated by a user P1. The user P1 drives the vehicle 2.

FIG. 1 illustrates one of the information processing apparatus 1, one of the vehicle 2, and one of the user terminal 3, for convenience of explanation. However, the number of information processing apparatuses 1, the number of vehicles 2, and the number of user terminals 3 are not limited to one. For example, processing to be executed by the information processing apparatus 1 according to the present embodiment may be executed by a plurality of distributed information processing apparatuses 1.

The information processing apparatus 1 is installed in a facility such as a data center. The information processing apparatus 1 is a computer such as a server that belongs to a cloud computing system or another type of computing system.

Figure 2:
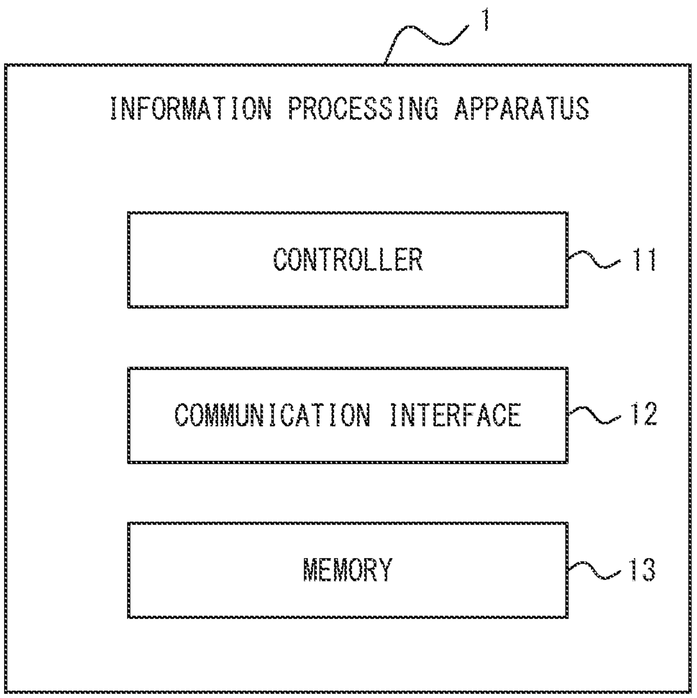
FIG. 2 is a block diagram illustrating a configuration of an information processing apparatus.

In FIG. 2, an internal configuration of the information processing apparatus 1 will be described in detail.

The information processing apparatus 1 includes a controller 11, a communication interface 12, and a memory 13. The components of the information processing apparatus 1 are communicably connected to one another via, for example, dedicated lines.

The controller 11 includes, for example, one or more general purpose processors including a Central Processing Unit (CPU) or a Micro Processing Unit (MPU). The controller 11 may include one or more dedicated processors that are dedicated to specific processing. The controller 11 may include one or more dedicated circuits instead of the processors. Examples of dedicated circuits may include a Field-Programmable Gate Array (FPGA) and an Application Specific Integrated Circuit (ASIC). The controller 11 may include an Electronic Control Unit (ECU). The controller 11 transmits and receives any information via the communication interface 12.

The communication interface 12 includes one or more communication modules for connection to the network NW that conform to wired or wireless Local Area Network (LAN) standards. The communication interface 12 may include a module conforming to one or more mobile communication standards including the Long Term Evolution (LTE) standard, the 4th Generation (4G) standard, or the 5th Generation (5G) standard. The communication interface 12 may include one or more communication modules conforming to near field communication standards or specifications, including Bluetooth® (Bluetooth is a registered trademark in Japan, other countries, or both), AirDrop® (AirDrop is a registered trademark in Japan, other countries, or both), IrDA, ZigBee® (ZigBee is a registered trademark in Japan, other countries, or both), Felica® (Felica is a registered trademark in Japan, other countries, or both), or RFID. The communication interface 12 transmits and receives any information via the network NW.

The memory 13 includes, for example, a semiconductor memory, a magnetic memory, an optical memory, or a combination of at least two of these, but is not limited to these. The semiconductor memory is, for example, RAM or ROM. The RAM is, for example, SRAM or DRAM. The ROM is, for example, EEPROM. The memory 13 may function as, for example, a main memory, an auxiliary memory, or a cache memory. The memory 13 may store information resulting from analysis or processing performed by the controller 11. The memory 13 may store various types of information or the like regarding operations and control of the information processing apparatus 1. The memory 13 may store a system program, an application program, embedded software, and the like. The memory 13 may be provided outside the information processing apparatus 1 and accessed by the information processing apparatus 1.

Figure 3:
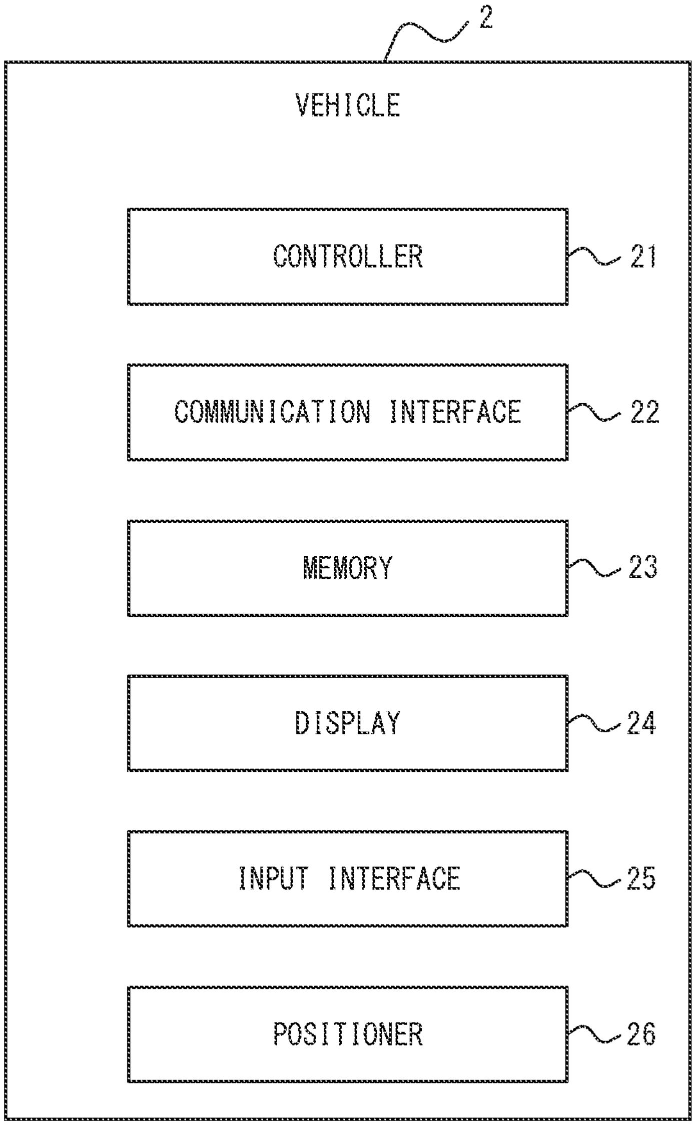
FIG. 3 is a block diagram illustrating a configuration of a vehicle.

In FIG. 3, an internal configuration of the vehicle 2 will be described in detail.

The vehicle 2 includes a controller 21, a communication interface 22, a memory 23, a display 24, an input interface 25, and a positioner 26. The components of the vehicle 2 are communicably connected to one another, for example, via a dedicated line.

The hardware configurations of the controller 21, the communication interface 22, and the memory 23 of the vehicle 2 may be the same as those of the controller 11, the communication interface 12, and the memory 13 of the information processing apparatus 1, respectively. The explanation here is omitted.

The display 24 is, for example, a display. The display is, for example, an LCD or an organic EL display. The term "LCD" is an abbreviation of liquid crystal display. The term "EL" is an abbreviation of electro luminescence. The display 24, instead of being included in the vehicle 2, may be connected to the vehicle 2 as an external output device. As the connection method, any technology such as USB, HDMI® (HDMI is a registered trademark in Japan, other countries, or both), or Bluetooth® can be used.

The input interface 25 is, for example, a physical key, a capacitive key, a pointing device, a touch screen integrally provided with a display, or a microphone. The input interface 25 accepts an operation for inputting information to be used for the operations of the vehicle 2. The input interface may be connected to the vehicle 2 as an external input device, instead of being provided to the vehicle 2. As the connection method, any technology such as USB, HDMI®, or Bluetooth® can be used. The term "USB" is an abbreviation of Universal Serial Bus. The term "HDMI®" is an abbreviation of High-Definition Multimedia Interface.

The positioner 26 includes at least one GNSS receiver. The term "GNSS" is an abbreviation of global navigation satellite system. GNSS includes, for example, GPS, QZSS, BeiDou, GLONASS, and/or Galileo. The term "GPS" is an abbreviation of Global Positioning System. The term "QZSS" is an abbreviation of Quasi-Zenith Satellite System. QZSS satellites are called quasi-zenith satellites. The term "GLONASS" is an abbreviation of Global Navigation Satellite System. The positioner 26 acquires positional information. Positional information is information that can identify the position of the vehicle 2, and includes, for example, coordinates.

The user terminal 3 is, for example, a mobile terminal such as a mobile phone, a smartphone, a wearable device, or a tablet. As an alternative example, the user terminal 3 may be a general purpose device such as a PC, or a dedicated device.

Figure 4:
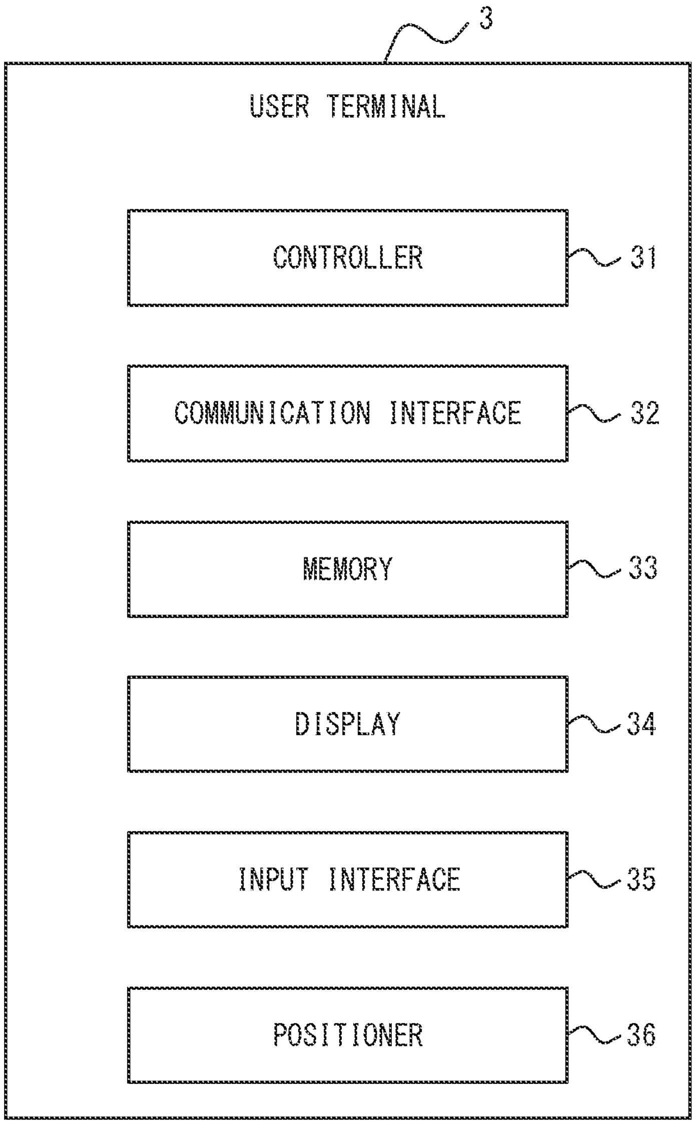
FIG. 4 is a block diagram illustrating a configuration of a user terminal.

In FIG. 4, an internal configuration of the user terminal 3 will be described in detail.

The user terminal 3 includes a controller 31, a communication interface 32, a memory 33, a display 34, an input interface 35, and a positioner 36. The components of the user terminal 3 are communicably connected to one another, for example, via a dedicated line.

The hardware configurations of the controller 31, communication interface 32, memory 33, display 34, input interface 35, and positioner 36 of the user terminal 3 may be the same as those of the controller 21, communication interface 22, memory 23, display 24, input interface 25, and positioner 26 of the vehicle 2, respectively. The explanation here is omitted.

An information processing method by the information processing apparatus 1 will be described in detail below with reference to FIG. 5.

In step S1, the controller 11 of the information processing apparatus 1 determines whether or not a predetermined operation has been forgotten with respect to vehicle 2. A predetermined operation includes at least one of the following:

turning off the hazard lamps;
closing the windows;
locking the doors; and
turning off the lights.

If No in step S1, the controller 11 executes step S1 again.

If Yes in step S1, the controller 11 determines in step S2 whether a predetermined time has elapsed since the predetermined operation was forgotten. The predetermined time is, for example but not limited to, one or two minutes. If No in step S2, the controller 11 executes step S2 again.

If Yes in step S2, the controller 11 acquires the positional information for vehicle 2 and user terminal 3 in step S3.

In step S4, the controller 11 determines whether the position of user terminal 3 is in the vicinity of the position of vehicle 2. The vicinity indicates, for example, within 100 meters. If Yes in step S4, the controller 11 ends the flow in FIG. 5.

If No in step S4, the controller 11 acquires vehicle information for the vehicle 2 in step S5. The vehicle information may be, for example, Controller Area Network (CAN) information.

In step S6, the controller 11 determines whether or not vehicle 2 is in an abnormal state from the vehicle information. An abnormal state may be, for example, a condition of failure or being involved in an accident, and includes at least one of the following:

a warning light being on;
the engine hood being open;
an airbag being deployed; and
connecting to a help net.

Figure 5:
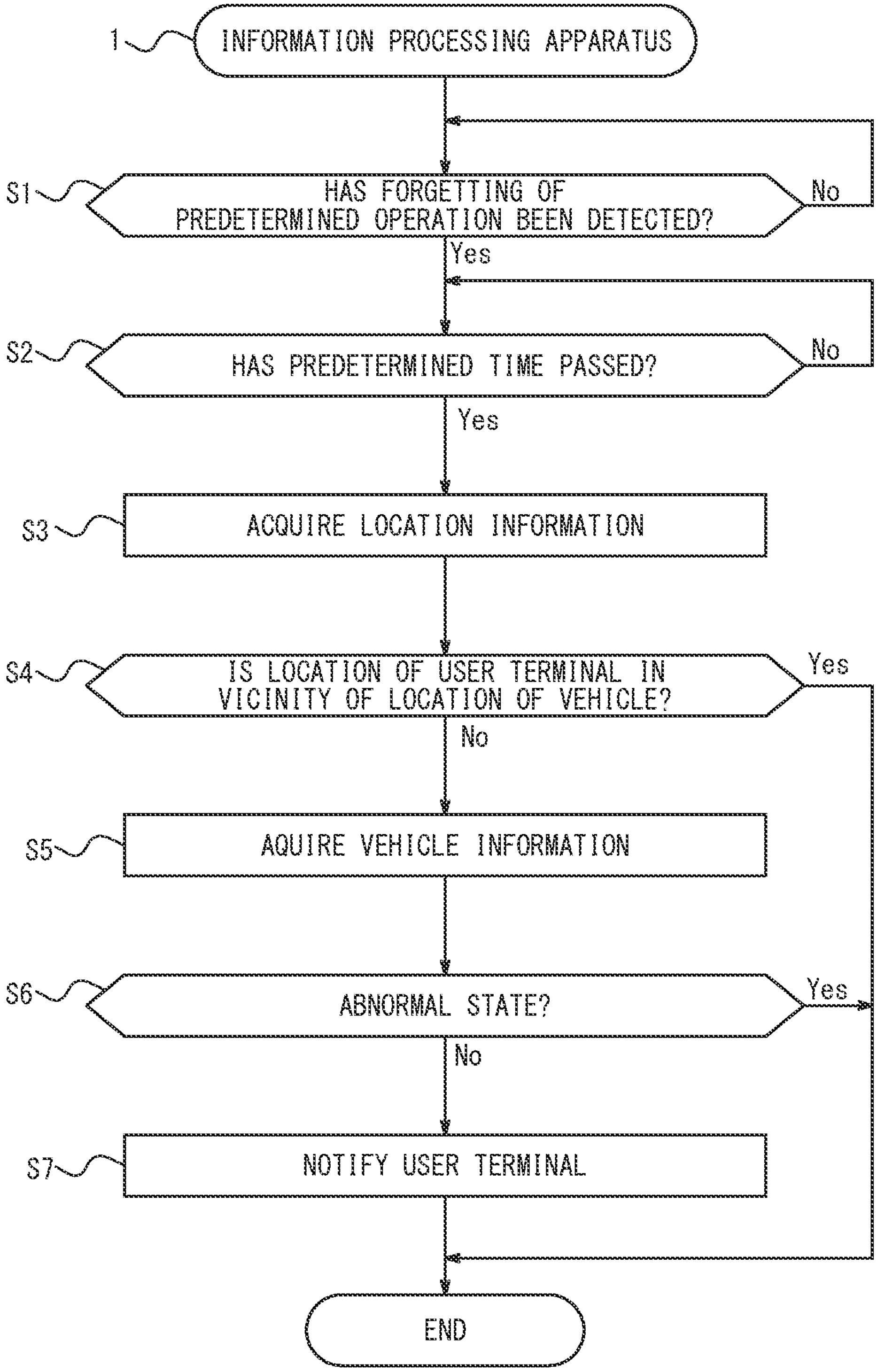
FIG. 5 is a flowchart illustrating operations of the information processing apparatus.

If Yes in step S6, the controller 11 ends the flow in FIG. 5. If No in step S6, then in step S7, the controller 11 notifies the user terminal 3 that a predetermined operation has been forgotten. Notification may be performed by any method, such as voice, screen display, lights, etc.

As described above, according to the present embodiment, the operations of the controller 11 include acquiring, upon detecting that a predetermined operation for the vehicle 2 has been forgotten, positional information for the vehicle 2 and positional information for the user terminal 3, acquiring, upon determining that a position of the user terminal 3 is not in the vicinity of a position of the vehicle 2, vehicle information for the vehicle 2, and not notifying, when the vehicle 2 is determined from the vehicle information to be in an abnormal state, the user terminal 3 that the predetermined operation has been forgotten, or notifying, when the vehicle 2 is determined from the vehicle information to be not in an abnormal state, the user terminal 3 that the predetermined operation has been forgotten. This configuration allows the information processing apparatus 1 to reduce the hassle of unnecessary notifications. For example, the information processing apparatus 1 can continue to flash the hazard lamps as required by the user in situations where the user forgets to turn off the hazard lamps, such as vehicle breakdowns, while reducing the number of forgotten operation notifications.

According to the present embodiment, the predetermined operation includes turning off the hazard lamps, closing the windows, locking the doors, and/or turning off the lights. The abnormal state of the vehicle 2 includes a warning light being on, the engine hood being open, an airbag being deployed, and/or connecting to a help net. This configuration allows the information processing apparatus 1 to reduce the hassle of unnecessary notifications in a variety of situations.

According to the present embodiment, the operations of the controller 11 also include acquiring, upon detecting that a predetermined time has passed in addition to that the predetermined operation for the vehicle 2 has been forgotten, the positional information for the vehicle 2 and the positional information for the user terminal 3. This configuration allows the information processing apparatus 1 to reduce the number of forgotten operation notifications when user P1 temporarily leaves vehicle 2 for reasons such as vehicle breakdown and returns after a predetermined time.

While the present disclosure has been described with reference to the drawings and examples, it should be noted that various modifications and revisions may be implemented by those skilled in the art based on the present disclosure. Other modifications can be made without departing from the spirit of the present disclosure. For example, functions or the like included in each means or each step can be rearranged without logical inconsistency, and a plurality of means or steps can be combined into one or divided.

For example, in the above embodiment, a program that executes all or some of the functions or processing of the information processing apparatus 1, the vehicle 2, and the user terminal 3 can be recorded on a computer readable recording medium. The computer readable recording medium includes a non-transitory computer readable medium and is, for example, a magnetic recording apparatus, an optical disc, a magneto-optical recording medium, or a semiconductor memory. The distribution of the program is performed by, for example, sale, transfer, or rental of a portable recording medium such as a digital versatile disc (DVD) or a compact disc read only memory (CD-ROM) on which the program is recorded. The program may also be distributed by storing the program in a storage of any server and transmitting the program from any server to another computer. The program may be provided as a program product. The present disclosure can also be implemented as a program executable by a processor.

The invention claimed is:

1. An information processing method by an information processing apparatus, the information processing method comprising:

acquiring, upon detecting that a predetermined operation for a vehicle has been forgotten, positional information for the vehicle and positional information for a user terminal;

acquiring, upon determining that a position of the user terminal is not in a vicinity of a position of the vehicle, vehicle information for the vehicle which is a Controller Area Network (CAN) information; and not notifying, when the vehicle is determined from the vehicle information to be in an abnormal state, the user terminal that the predetermined operation has been forgotten, and notifying, when the vehicle is determined from the vehicle information to be not in an abnormal state, the user terminal that the predetermined operation has been forgotten.

2. The information processing method according to claim 1, wherein the predetermined operation includes turning off hazard lamps, closing windows, locking doors, and/or turning off lights.

3. The information processing method according to claim 1, wherein an abnormal state of the vehicle includes a warning light being on, an engine hood being open, an airbag being deployed, and/or connecting to a help net.

4. The information processing method according to claim 1, comprising acquiring, upon detecting that a predetermined time has passed in addition to that the predetermined operation for the vehicle has been forgotten, the positional information for the vehicle and the positional information for the user terminal.

* * * * *